United States Patent [19]

Kawasaki

[11] 4,181,413

[45] Jan. 1, 1980

[54] ELECTRONIC SHUTTER CONTROL CIRCUIT

[75] Inventor: Masahiro Kawasaki, Tokyo, Japan

[73] Assignee: Asahi Kogaku Kogyo Kabushiki Kaisha, Tokyo, Japan

[21] Appl. No.: 944,213

[22] Filed: Sep. 20, 1978

[30] Foreign Application Priority Data

Sep. 22, 1977 [JP] Japan ................................. 52/114134

[51] Int. Cl.$^2$ ............................................. G03B 7/08
[52] U.S. Cl. ......................................... 354/24; 354/50; 354/51; 354/60 R
[58] Field of Search ..................... 354/24, 50, 51, 60 R

[56] References Cited

U.S. PATENT DOCUMENTS

| | | |
|---|---|---|
| 3,820,126 | 6/1974 | Haratake ............................ 354/24 |
| 3,852,774 | 12/1974 | Taguchi et al. ..................... 354/24 |
| 4,000,498 | 12/1976 | Tunekawa et al. .................. 354/24 |
| 4,099,188 | 7/1978 | Uno et al. ........................... 354/24 |
| 4,141,633 | 2/1979 | Uno et al. ........................... 354/24 |

Primary Examiner—Russell E. Adams
Attorney, Agent, or Firm—Sughrue, Rothwell, Mion, Zinn and Macpeak

[57] ABSTRACT

An electronic shutter control circuit in a camera has an operational amplifier, a light receiving element connected between the input terminals of the operational amplifier and a logarithmic compression diode, one terminal of which is connected to the cathode of the light receiving element. The circuit further comprises an integrating capacitor, one terminal being connected to the cathode of the light receiving element and the other terminal together with the remaining terminal of said logarithmic compression diode being connected through respective resistors to the anode of the light receiving element. A timing switch is operated in synchronization with the running of a shutter top curtain, and the output terminal of the operational amplifier is connected from a terminal of said logarithmic compression diode to the other terminal of the integrating capacitor by the operation of said timing switch.

10 Claims, 3 Drawing Figures

ELECTRONIC SHUTTER CONTROL CIRCUIT

BACKGROUND OF THE INVENTION

This invention relates to an electronic shutter control circuit having a compression operational circuit employed in the display circuit or the aperture control circuit of an electronic shutter camera, and an integrating circuit employed in the shutter control circuit thereof.

In a conventional camera electronic shutter circuit, prior to shutter release, light passed through a photographing lens is received by a light receiving element and the resulting optical current of the light receiving element is subjected to logarithmic compression. The resultant value together with information on film sensitivity and aperture value are subjected to calculation to obtain shutter speed information. The shutter speed logarithmic compression information is displayed and stored, and the information thus stored is subjected to logarithmic expansion to control the shutter.

In the camera of this type, an optical current of the order of $2^{20}$ of the light receiving element is subjected to logarithmic compression, and therefore the calculation with the film sensitivity and aperture value information can be readily achieved. However, variation in information suitable for the shutter speed display is obtained.

Also, in this method storage is completed with the light receiving section or the reflecting mirror retracted from the optical path of the object before the shutter is operated. Suitable response cannot therefore be obtained with respect to variations caused when the film is subjected to exposure, and hence if the object's brightness is changed greatly, it may be photographed with incorrect exposure conditions.

In order to overcome the above-described difficulty, a device has been developed in which the light from an object is reflected by the surface of a film or the shutter bottom curtain immediately before the film, and the reflected light is then metered. However, this device is not compatible with the above-described method of subjecting the optical current of the light receiving element to logarithmic compression, because if the aperture blades provided in the photographing lens are stopped down to a predetermined value, the amount of reflected light is very small. Suitable output currents cannot be attained.

In order to effectively use such a device where light from an object is reflected by the surface of a film or the shutter bottom curtain immediately before the film and the reflected light is measured as described above, an electronic shutter circuit as shown in FIG. 1 has been proposed.

Referring now to FIG. 1, a light receiving element 1 is connected across the input terminals of an operational amplifier 4. An integrating capacitor 3 and a timing switch 2 which is opened in synchronization with the running of the shutter top curtain are connected between the output terminal of the operational amplifier 4 and the inversion input terminal of the same. A constant current source 6 is connected to a variable resistor 7 which is set according to an ASA sensitivity of the film. The connection point of the constant current source and the variable resistor 7, and the output terminal of the operational amplifier 4 are connected to the input terminals of comparator 5, respectively. The output terminal of the comparator 5 is connected to the base of a transistor 9 adapted to drive a shutter bottom curtain controlling magnet 8. Reference numeral 10 designates an electric source.

In operation, after passing through the photographing lens, light from an object is reflected by the surface of a film or the shutter curtain provided immediately before the film to reach the light receiving element 1 whereupon the latter 1 produces an output optical current. When the timing switch 2 is in a closed state, the optical current flows through the timing switch 2. Therefore, the output voltage of the operational amplifier 4 is zero which is lower than the terminal voltage of the variable resistor 7. Thus, current is applied from the output of the comparator 5 to the base of the transistor 9, and therefore the bottom curtain controlling magnet 8 is energized.

When the timing switch 2 is opened in synchronization with the running of the shutter top curtain, the optical current is integrated by the integrating capacitor 3. When the voltage of the capacitor reaches to terminal voltage of the variable resistor 7, the state of the comparator 5 is changed and thereby deenergizes the bottom curtain controlling magnet 8. The elapse-time interval from the opening of the timing switch 2 until the deenergization of the bottom curtain controlling magnet 8 is therefore the exposure time for the film with a correct exposure. If the optical current of the light receiving element 1, the capacitance of the integrating capacitor 3, and the terminal voltage of the variable resistor 7 are represented by $i_P$, $C_0$, and $V_S$, respectively, then the exposure time T can be expressed by the following Equation(1):

$$T = C_0 \cdot V_S / i_P \qquad (1)$$

The optical current $i_P$ is expressed by the following Equation (2):

$$i_P = K_0 \cdot B / A^2 \qquad (2)$$

where B is the object's brightness, A is the aperture value, and $K_0$ is the proportional constant.

The terminal voltage $V_S$ of the variable resistor 7 which can be set for an ASA sensitivity S can be expressed by the following Equation (3):

$$V_S = K_1 / S \qquad (3)$$

where $K_1$ is the proportional constant.

Therefore, from Equations (1), (2) and (3), the exposure time T can be expressed as follows:

$$T = K_2 \cdot A^2 B \cdot S \qquad (4)$$

where $K_2 = C_0 \cdot K_1 / K_0$

Thus, with the value $K_2$ is suitably selected, the value T of Equation (4) is the exposure time with which the film is correctly exposed.

As is apparent from the above description, with the circuit shown in FIG. 1, the shutter can be controlled by metering the light from an object which has been reflected by the surface of the film or the surface of the shutter bottom curtain provided immediately before the film. However, the circuit of FIG. 1 still has a serious disadvantage. Because, the discharge and integration of the integrating capacitor are initiated by a mechanical switch, the leakage resistance of the mechanical switch is a problem that remains. Therefore, the physical position of the mechanical switch is limited to locations around the light receiving element and the circuit pattern, and it is impossible to use the mechanical type of switch commonly for the manual shutter control circuit, etc. In order to overcome this difficulty it has been suggested to replace the mechanical switch with a semiconductor switching means. However, this method is not practical, because the resistance of the semiconductor is low when it is in an off state.

Furthermore, if the system is required to perform a display function in association with the circuit in FIG. 1, in addition to the light receiving element in FIG. 1 another light receiving element must be provided for the display. Hence, it is necessary to subject the optical current of the latter to logarithmic compression to perform the display function.

SUMMARY OF THE INVENTION

In view of the foregoing, a first object of this invention is to positively measure reflected light having considerably low intensity by applying a substantially zero bias to the light receiving element adapted to measure the reflected light.

A second object of the invention is, that prior to the shutter operation, the optical current of the light receiving element is subjected to logarithmic compression, and the resulting logarithmic compression information is utilized for shutter speed display or aperture control.

A third object of the invention is to permit the integrating capacitor to integrate the optical current of the light receiving element in synchronization with the camera shutter operation.

A fourth object of the invention is to provide a circuit in which the start of integration of the integrating circuit is not directly effected by the mechanical switch to eliminate the effect of the leakage resistance of the mechanical switch, and to eliminate the positional limitation in installation of the mechanical switch.

These and other objects of this invention are realized in an electronic shutter control circuit having an operational amplifier with a light receiving element connected between the input terminals thereof. A logarithmic compression diode is connected at one terminal to the cathode of the light receiving element. An integrating capacitor has one terminal coupled to the cathode of the light receiving element and the other terminal together with the remaining terminal of the compression diode is coupled to the anode of the light receiving element through a resistor network. A timing switch is operated in synchronization with the shutter top curtain of the camera. By operation of the timing switch the operational amplifier is switched from coupling with the logarithmic compression diode to the integrating capacitor.

BRIEF DESCRIPTION OF THE DRAWINGS

A first preferred embodiment of this invention is shown in FIG. 2. In FIG. 2, reference numeral 13 designates a constant current source which is connected to the collector of a transistor 14. Feed-back is effectuated from the collector of the transistor 14 to the base thereof through a transistor 11 in an emitter follower connection with a resistor 12. The base of a transistor 15 is connected to the common line and the collector of transistor 14. The emitter of the transistor 15 is connected to a variable resistor 17 which is set to a film sensitivity, and to an operational amplifier 18 of the voltage follower type. The collector of the transistor 15 is connected to the common base of a diode-connected transistor 16 and a transistor 19.

Figure 1:
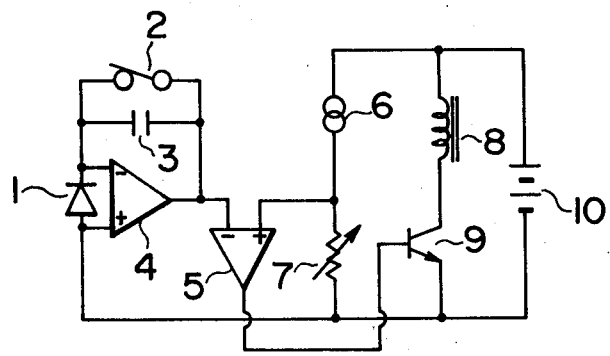
FIG. 1 is a circuit diagram, partly as a block diagram, showing a conventional electronic shutter circuit.

A variable resistor 20 for adjusting exposure time is connected between the collector of the transistor 19 and the output terminal of the operational amplifier 18. The output terminal amplifier 18 is connected to the non-inversion terminal of a high input resistance operational amplifier 22.

A light receiving element 21, a logarithmic compression diode 23, a resistor 24, an integrating capacitor and a resistor 27 are connected between the input terminals of the operational amplifier 22. Connected to the output terminal of the operational amplifier 22 is a terminal c of a timing switch as whose armature is tripped from terminal a to terminal b in synchronization with the running of the shutter top curtain.

An operational amplifier 30 forms an inversion amplifier with an input resistor 32 and a feedback resistor 29. The non-inversion input terminal of the operational amplifier 30 is connected to the output terminal of the operational amplifier 18, while the output terminal of the operational amplifier 30 is connected to the anode of a diode 28. The cathode of diode 28 is connected to the cathode of the light receiving element 21.

A transistor 33 forms an emitter follower circuit with a variable constant current source 34 which can be set according to an aperture value. The base of the transistor 33 is connected to one terminal of a resistor 32 and to the connection point of the logarithmic compression diode 23 and the resistor 24 (which is the terminal a of the switch 25.) A meter 35 is connected between the connection point of a diode-connected transistor 37 and a constant current source 36 and the emitter of the transistor 33.

The inversion input terminal of a comparator 31 is connected to the connection point of the integrating capacitor 6 and the resistor 27 (which is the terminal b of the switch 25), while the non-inversion input terminal thereof is connected to the connection point of the collector of the transistor 19 and the variable resistor 20. The output terminal of the comparator 31 is connected to the base of a transistor 39. The collector of transistor 39 is connected a bottom curtain control magnet 38. Reference numeral 40 designates an electric source.

The operation of the circuit shown in FIG. 2 will now be described.

As indicated herein, the constant current source 13 is connected to the collector of the transistor 14. Feed-back is obtained from the collector of the transistor 14 to the base thereof. Therefore, if the current value of the constant current source 13 is represented by $I_1$, then the base-emitter voltage $V_{BE}$ ($Q_{14}$) of the transistor 14 can be expressed by the following Equation (5):

$$V_{BE}(Q_{14}) = n \log I_1/i_0 + V_{BE}(i_0) \tag{5}$$

with $n = K \cdot T/q$,
where K is the Boltzmann's constant T is the absolute temperature; q is the electron charge, and $V_{BE}(i_0)$ is the base-emitter voltage of the transistor when the collector current is $i_0$.

If it is assumed that the resistor 12 has a resistance $R_1$ and the variable resistor 17 has a resistance $R_2$, then the emitter voltage $V_A$ of the transistor 15 is:

$$V_A = V_{BE}(Q_{14}) + n \log R_2/R_1 \quad (6)$$

Under the condition that the armature of the timing switch 25 has been tripped over to terminal a, the logarithmic compression diode 23 is connected in the feedback circuit of the high input resistance operational amplifier 22, and a logarithmic compression voltage $V_C$ is produced in proportion to the optical current $i_P$ of the light receiving element 21, as expressed by the following Equation (7):

$$V_C = n \log i_P/i_0 + V_D(i_0) \quad (7)$$

where $V_D$ is the forward voltage of the diode with the diode forward current $i_0$.

On the other hand, if the current value of the constant current source 34 is represented by $I_2$ and the current value of the constant current source 36 is represented by $I_3$, then the base-emitter voltage $V_{BE}(Q_{33})$ of the transistor 33 and the base-emitter voltage $V_H$ of the transistor 37 can be expressed by the following Equation (8) and (9), respectively:

$$V_{BE}(Q_{33}) = n \log I_2/i_0 + V_{BE}(i_0) \quad (8)$$

$$V_H = n \log I_3/i_0 + V_{BE}(i_0) \quad (9)$$

The meter voltage $V_G$ is:

$$V_G = V_A + V_C - V_{BE}(Q_{33}) - V_H \quad (10)$$

By substituting Equations (6), (7), (8) and (9) into Equation (10), the following Equation (11) can be obtained:

$$V_G = n \log (I_1 \cdot i_P \cdot R_2 / I_2 \cdot I_3 \cdot R_1) + V_0(i_0) - V_{BE}(i_0) \quad (11)$$

If the base-emitter voltage of the transistor is equal to the diode forward voltage with the current $i_0$, then Equation (11) can be rewritten as follows:

$$V_G = n \log (I_1 \cdot i_P \cdot R_2 / I_2 \cdot I_3 \cdot R_1) \quad (12)$$

If the values $i_p$, $R_2$ and $I_2$ are related to the APEX indication values $B_V$, $S_V$ and $A_V$ of the object's brightness B, the film sensitivity S, and the aperture value A re as follows, respectively;

$$i_P = i_{P0} \cdot 2^{B_V} \quad (13)$$

$$R_2 = R_0 \cdot 2^{S_V} \quad (14)$$

$$I_2 = i_S \cdot 2^{A_V} \quad (15)$$

where $i_{P0}$ is the optical current of the light receiving element with $B_V = 0$, $R_0$ is the resistance of $R_2$ with $S_V = 0$, and $i_S$ is the current value of $I_2$ with $A_V = 0$ then, $V_G$ can be expressed by the following Equation (16):

$$V_G = K_3 + (B_V + S_V - A_V) n \log 2$$
$$= K_3 + T_V n \log 2 \quad (16)$$

where
$$K_3 = n \log (I_1 \cdot i_{P0} \cdot R_0 / i_S \cdot I_3 \cdot R_1)$$

$T_V$: the APEX indication value of the exposure time T.

Hence, the voltage $V_G$ is in proportion to the APEX indication value of the exposure time T, and the exposure time can be indicated by the meter 35.

If the shutter button is depressed, the mirror is swung upward and the aperture-stopping-down operation is effected. Thereafter, the armature of the timing switch 25 is tripped from the terminal a to the terminal b in synchronization with the running of the shutter top curtain. As a result, the integrating capacitor 26 is connected (inserted) in the feedback circuit to carry out integration of the optical current of the light receiving element 21. When the armature of the timing switch 25 is maintained connected to the terminal a, the voltage of the integrating capacitor is zero. Therefore, if the capacitance of the integrating capacitor 26 is represented by $C_1$, then the integration voltage $V_D$ is:

$$V_D = 1/C_1 \int_0^T i_P dT \quad (17)$$

On the other hand, the voltage $V_B$ across the variable resistor 20 can be expressed by the following Equation (18):

$$V_B = V_A/R_2 = V_A/R_0 \cdot 2^{S_V} \quad (18)$$

where $R_3$ is the resistance of the resistor 20. When $V_D = V_b$, the output level of the comparator is changed from a high level to a low level, as a result of which energization of the bottom curtain control magnet 38 is suspended. The time interval, or the exposure time $T_O$, which elapses from the operation of the timing switch 25 till the deenergization of the bottom curtain control magnet 38 is:

$$T_0 = K_4 \cdot A^2 / S \cdot B \quad (19)$$

where
$K_4 = C_1 \cdot V_A / K_0 \cdot R_0 \cdot N$ in which
N: the proportional constant (=0.30)
Thus, if the value is suitably determined, the value $T_0$ in Equation (19) is the exposure time to give a correct exposure to the film.

The function of the operational amplifier 30, the resistors 29 and 32, and the diode 28 will now be described.

When the armature of the timing switch 25 is at terminal a, the logarithmic compression ciode 23 has a charge of $C_j \cdot V_C$ (in which $C_j$ is the junction capacitance of the logarithmic compression diode). If the armature of the timing switch 25 is tripped to terminal b, then the charge of the diode 23 is transferred to the integrating capacitor 26. As a result, the terminal voltage of the integrating capacitor 26 is abruptly increased as much as $V_D = (C_j / C_1) V_C$, which will cause an error in exposure time.

In order to prevent this phenomenon, the operational amplifier 30, resistors 29 and 32 and diode 28 are provided. If the resistance of the resistor 32 is equal to that of the resistor 29, then the voltage $V_E$ between the output terminal of the operational amplifier 30 and the cathode of the logarithmic compression diode 23 becomes $-V_C (V_E = -C)$, and the charge of the diode 28 is $-C_{j1} \cdot V_C$ (in which $C_{j1}$ is the junction capacitance of the diode 28). When the armature of the timing switch 25 is tripped to terminal b, then the above-described charge is applied to the integrating capacitor 26. As a result, the terminal voltage $V_D$ of the integrating capacitor can be expressed by the following Equation (20):

$$V_D = \frac{C_j}{C_1} \cdot V_C - \frac{C_{j1}}{C_1} V_C \quad (20)$$

Since $C_j = C_{j1}$, then $V_D = 0$. Thus, the error in exposure time due to the junction capacitance $C_j$ of the logarithmic compression diode can be eliminated.

Figure 3:
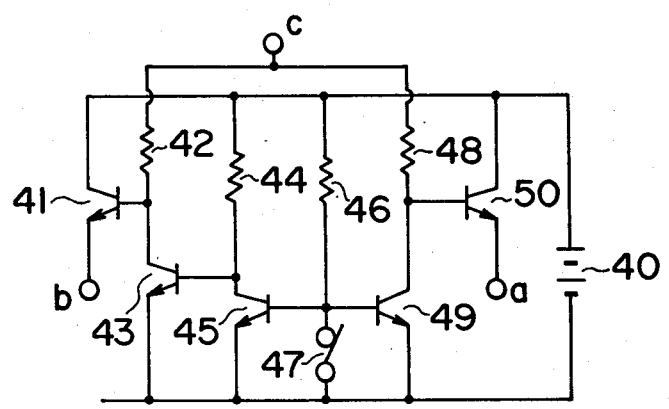
FIG. 3 is a circuit diagram showing one modification of a timing switch 25 in FIG. 2, which is made up of semiconductor switching means.
Figure 2:
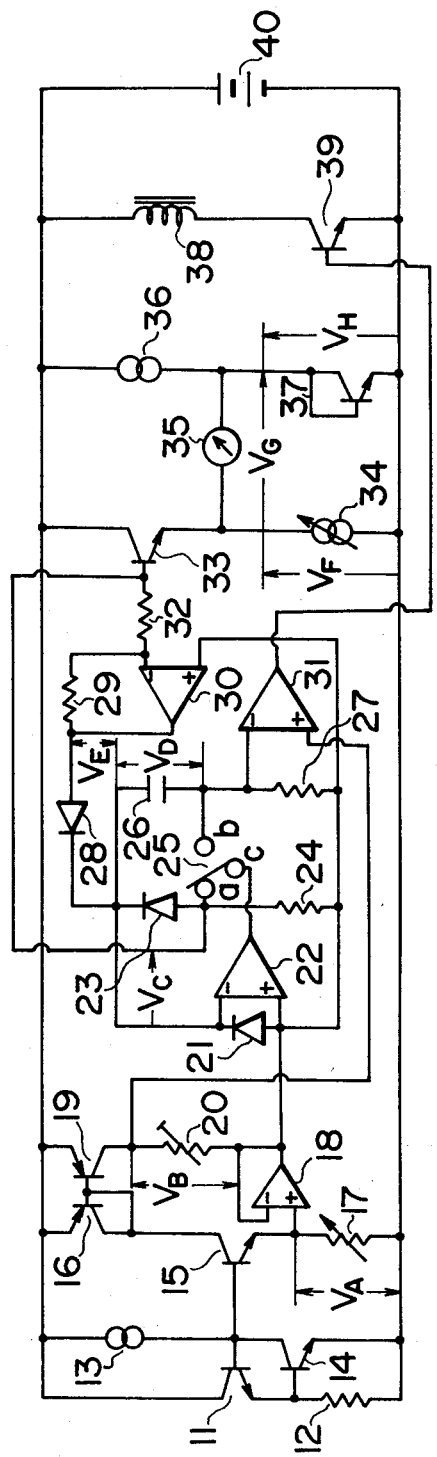
FIG. 2 is a circuit diagram, partly as a block diagram, illustrating one preferred embodiment of this invention.

Referring now to FIG. 3 one example of the timing switch shown in FIG. 2 is shown formed with semiconductor switching elements. In FIG. 3 the emitter a of a transistor 50, and the emitter b of a transistor 41 together with the common connection point c of resistors 42 and 48 are connected to the timing switch 25 in FIG. 2, respectively, The common connection c is coupled to the bases of 41 and 50 through resistors 42 and 48. A timing switch 47 is maintained closed and is opened in synchronization with the running of the shutter top curtain. Thus, the circuit shown in FIG. 3 functions with the aid of the operation of the timing switch 47 in an analogous manner to the timing switch 25.

When the timing switch 47 is in its closed state, a transistor 45 is non-conductive (off), while a transistor 43 is conductive (on). Therefore, the transistor 41 is reversely baised, and the terminal b is in open state. On the other hand, a transistor 49 is non-conductive (off), and the output of the operational amplifier 22 (FIG.2) is applied through a resistor 48 and the transistor 50 to the terminal a.

When the timing switch 47 is opened, the transistor 43 is rendered non-conductive, while the transistor 49 is rendered conductive. Therefore, the terminal a is brought to an open state, and the output of the operational amplifier is applied to a resistor 42 and the transistor 41 through terminal b.

As is apparent from the above description, the change-over type timing switch 25 in FIG. 2 can be replaced by the on-off type timing switch shown in FIG. 3.

In the embodiment shown in FIG. 2, the exposure time indication is effectuated through the operation of the logarithmic compression voltage of the optical current of the light receiving element, the aperture value, and the film sensitivity. However, it is possible as shown in this art to apply the technical concept of this invention to the control of the aparture based on the operation of the logarithmic compression voltage, the exposure time, and the film sensitivity.

As was described above, according to this invention, the light receiving element is connected between the input terminals of the operational amplifier and one terminal of the logarithmic compression diode. One terminal of the integrating capacitor is also connected to the cathode of the light receiving element, the other terminal of the logarithmic compression diode and the integrating capacitor are connected through the respective resistors to the anode of the light receiving element. The output of the operational amplifier is connected from the other terminal of the logarithmic compression diode to the other terminal of the integrating terminal by the timing switch which is operated in synchronization with the running of the shutter top curtain. Therefore, the electronic shutter control circuit according to the invention has the following characteristics:

(1) Since it is possible to apply nearly a zero bias to the light receiving element, even low level reflected light can be positively measured.

(2) Prior to the shutter operation in the camera, the optical current of the light receiving element can be subjected to logarithmic compression, and therefore, the indication of shutter speed or control of the aperture can be obtained with the aid of the resultant logarithmic compression information.

(3) Shutter control can be achieved by integrating the optical current with the light receiving element described above in synchronization with the shutter operation in the camera.

(4) The start of integration and the resetting of the integrating capacitor can be achieved by a circuit not affected by the leakage resistance of the mechanical switch rather than directly by the mechanical switch. Therefore, the installation place of the mechanical switch is not limited.

It is apparent that other advantages of this invention will be apparent to one working in this technology. Also, other changes or modifications will be apparent without departing from the essential scope of this invention.

I claim:

1. A control circuit for a camera having a shutter mechanism, comprising;
   (a) a first operational amplifier having a pair of input terminals and an output terminal;
   (b) a light receiving element connected between said input terminals of the amplifier, said element having an anode and a cathode;
   (c) a logarithmic compression diode, said diode having first and second terminals, said first terminal being connected to the cathode of said light receiving element;
   (d) an integrating capacitor having first and second terminals, said first terminal of said capacitor coupled to the cathode of the light receiving element and, the second terminal of both said capacitor and said compression diode being coupled to the anode of said light receiving element; and
   (e) timing switch means operable in synchronization with said shutter mechanism to selectively couple the output terminal of said first operational amplifier to either said second terminal of the compression diode or to said second terminal of the capacitor.

2. The circuit of claim 1 further comprising;
   (f) a second operational amplifier forming an inversion amplifier, said second amplifier having a non-inversion input connected to the anode of said light receiving element and, an inversion input connected to the second terminal of said compression diode, and the output of said second amplifier coupled to the cathode of said light receiving element.

3. The circuit as claimed in claim 1 or 2, wherein when the output terminal of said first operational amplifier is connected to the second terminal of said logarithmic compression diode, shutter speed indication of the shutter mechanism is obtained by a calculation of a voltage between the anode of said light receiving element, the second terminal of said logarithmic compression diode and a logarithmic compression voltage corresponding to a film sensitivity and a given aperture value.

4. The circuit as claimed in claim 1 or 2, wherein when the output terminal of said first operational amplifier is connected to the second terminal of said logarithmic compression diode, shutter speed indication of the shutter mechanism is obtained by a caluculation of a voltage between the anode of said light receiving element, the second terminal of said logarithmic compression diode and a logarithmic compression voltage corresponding to a film sensitivity and a given shutter speed.

5. The circuit as claimed in claim 1 or 2, wherein when the output terminal of said first operational amplifier is connected to the second terminal of said integrating capacitor, shutter speed is controlled by comparison of a voltage between the anode of said light receiving element and the second terminal of said integrating capacitor with a voltage corresponding to a given film sensitivity.

6. The system as defined in claim 1 wherein said timing switch is operable in synchronization with the running of a shutter top curtain of said shutter mechanism.

7. The system as defined in claim 1 further comprising resistor means interposed respectively between said second terminals of said capacitor and compression diode and the anode of said light receiving diode.

8. The circuit of claim 2 further comprising a diode interposed between the output of said second operational amplifier and the cathode of said light receiving element.

9. The circuit of claim 1 wherein said timing switch means comprises an array of semiconductor switch elements.

10. The circuit of claim 9 wherein said array of semiconductor switch elements comprises, a first and second transistors having their respective emitters forming switch points to selectively coupled said first operational amplifier, a resistor array forming a common switch point, a timing switch operable in synchronization with said shutter mechanism and means coupling said first and second transistors to said timing switch to selectively bias said first and second transistors and open or close said switch points.

* * * * *